(12) United States Patent
Sheem et al.

(10) Patent No.: US 9,005,815 B2
(45) Date of Patent: Apr. 14, 2015

(54) NEGATIVE ACTIVE MATERIAL FOR RECHARGEABLE LITHIUM BATTERY, METHOD OF PREPARING SAME, AND RECHARGEABLE LITHIUM BATTERY

(75) Inventors: Kyeu-Yoon Sheem, Yongin-si (KR); Bok-Hyun Ka, Yongin-si (KR); Da-Woon Han, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 296 days.

(21) Appl. No.: 12/948,672

(22) Filed: Nov. 17, 2010

(65) Prior Publication Data

US 2011/0274979 A1    Nov. 10, 2011

(30) Foreign Application Priority Data

May 7, 2010  (KR) .................. 10-2010-0043181

(51) Int. Cl.
*H01M 4/583*   (2010.01)
*H01M 4/587*   (2010.01)
*H01M 4/133*   (2010.01)
*H01M 4/1393*  (2010.01)

(52) U.S. Cl.
CPC .............. *H01M 4/587* (2013.01); *H01M 4/133* (2013.01); *H01M 4/1393* (2013.01); *Y02E 60/122* (2013.01)

(58) Field of Classification Search
CPC ........................ H01M 4/133; H01M 4/1393
USPC .................. 429/218.1, 231.8, 484; 252/182.1
See application file for complete search history.

(56) References Cited

U.S. PATENT DOCUMENTS

| | | | |
|---|---|---|---|
| 5,773,167 A | * | 6/1998 | Iwasaki et al. ............. 429/231.8 |
| 6,869,546 B1 | * | 3/2005 | Yanagida et al. ............. 252/502 |
| 2004/0036060 A1 | * | 2/2004 | Morita et al. ................. 252/500 |
| 2006/0281004 A1 | * | 12/2006 | Yata et al. ..................... 429/162 |

FOREIGN PATENT DOCUMENTS

| | | | |
|---|---|---|---|
| JP | 08-124569 A | | 5/1996 |
| JP | 11-354120 A | | 12/1999 |
| JP | 2000-001306 A | | 1/2000 |
| JP | 2001-250535 A | | 9/2001 |
| JP | 2007042571 | * | 2/2007 |
| JP | 2008-103350 A | | 5/2008 |
| JP | 2009-117334 A | | 5/2009 |
| JP | 2010-118243 A | | 5/2010 |
| KR | 10-20020002412 A | | 1/2002 |
| KR | 10-2006-0041315 A | | 5/2006 |
| WO | WO 2009020357 | * | 2/2009 |

OTHER PUBLICATIONS

JP 2007042571—Translation.*
Korean Notice of Allowance dated Dec. 30, 2011, 5 pages.

* cited by examiner

*Primary Examiner* — Ladan Mohaddes
(74) *Attorney, Agent, or Firm* — Knobbe Martens Olson & Bear LLP

(57) ABSTRACT

A negative active material for a rechargeable lithium battery, a method of manufacturing the same, and a rechargeable lithium battery including the negative active material. The negative active material includes carbon particles having interplanar spacing (d002) ranging from about 0.34 nm to about 0.50 nm at a 002 plane, measured by X-ray diffraction using CuKα, and nitrogen on the surface of the carbon particles.

4 Claims, 1 Drawing Sheet

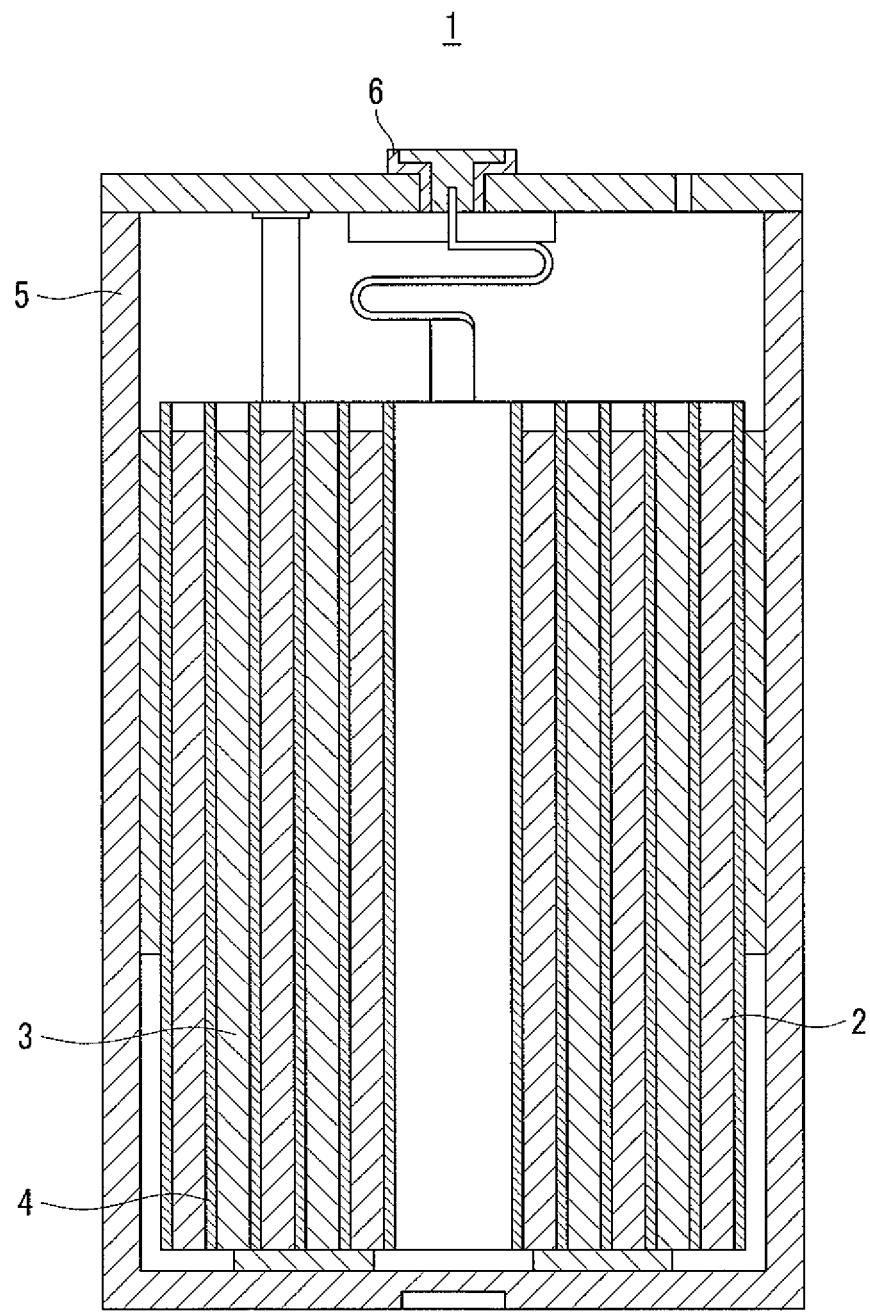

NEGATIVE ACTIVE MATERIAL FOR RECHARGEABLE LITHIUM BATTERY, METHOD OF PREPARING SAME, AND RECHARGEABLE LITHIUM BATTERY

CROSS-REFERENCE TO RELATED APPLICATIONS

This application claims the benefit of Korean Patent Application No. 10-2010-0043181, filed in the Korean Intellectual Property Office on May 7, 2010, the disclosure of which is incorporated herein by reference.

BACKGROUND

1. Field

Aspects of this disclosure relate to a negative active material for a rechargeable lithium battery, a method of manufacturing the same, and a rechargeable lithium battery including the same.

2. Description of the Related Technology

Lithium rechargeable batteries have recently drawn attention as power sources for small portable electronic devices. Since they use an organic electrolyte solution, they have twice the discharge voltage of conventional batteries using an alkali aqueous solution, and accordingly have high energy density.

As for positive active materials for a rechargeable lithium battery, lithium-transition element composite oxides being capable of intercalating lithium such as $LiCoO_2$, $LiMn_2O_4$, $LiNi_{1-x}CO_xO_2$ ($0<x<1$), and so on have been researched.

As for negative active materials for a rechargeable lithium battery, various carbon-based materials such as artificial graphite, natural graphite and hard carbon, which can all intercalate and deintercalate lithium ions, a metal-based material such as Si and the like, or a lithium composite compound such as lithium vanadium oxide have been used.

Herein, soft carbon refers to a carbon material that can be converted into the crystal structure of graphite, while hard carbon refers to a carbon material that cannot be converted into the crystal structure of graphite. In general, since soft carbon is prepared from residues remaining after treatment of petroleum charcoal, soft carbon costs relatively less than hard carbon, while since hard carbon is prepared by heat-treating a resin-based polymer, hard carbon tends to cost more. Soft carbon is more likely to be converted into graphite than hard carbon. and thus has relatively higher crystallinity than hard carbon.

Since graphite has high crystallinity and thus large capacity but small openings in the crystal lattice where lithium ions can enter, and thus high resistance against the ions, graphite may not be good for high input or output. On the other hand, carbons have low crystallinity, and so have small and largely non-reversible capacity. However, the carbons have large edges where ions can rapidly come in and go out, and therefore hard carbons can exhibit high input and output.

SUMMARY OF CERTAIN INVENTIVE ASPECTS

An exemplary embodiment of the present invention provides a negative active material for a rechargeable lithium battery having an excellent high power characteristic.

Another embodiment of the present invention provides a method of manufacturing the negative active material.

Still another embodiment of the present invention provides a rechargeable lithium battery including the negative active material.

According to an embodiment of the present invention, a negative active material for a rechargeable lithium battery provides carbon particles having interlayer spacing (d002) ranging from about 0.34 nm to about 0.50 nm at a 002 plane measured by X-ray diffraction using CuKα. The carbon particles include nitrogen on the surface.

The nitrogen is included in an amount ranging from about 0.1 wt % to about 5 wt % based on the entire weight of the negative active material.

The carbon particles may be amorphous.

According to another embodiment of the present invention, a method of manufacturing the negative active material for a rechargeable lithium battery includes mixing a nitrogen-containing compound with carbon particles having interlayer spacing (d002) ranging from about 0.34 nm to about 0.50 nm at a 002 plane, measured by X-ray diffraction using CuKα, and heat-treating the mixture.

The nitrogen-containing compound may include poly N-vinylpyrrolidone, polyacrylonitrile, a melamine-formaldehyde resin, aniline, or a combination thereof.

The carbon particles and the nitrogen-containing compound may be mixed in a ratio ranging from about 99.5:0.5 wt % to about 70:30 wt %.

The heat treatment may be performed at a temperature ranging from about 500° C. to about 1500° C.

According to still another embodiment of the present invention, a rechargeable lithium battery includes a negative electrode including the negative active material, a positive electrode including a positive active material, and a non-aqueous electrolyte.

Additional aspects and/or advantages of the invention will be set forth in part in the description which follows and, in part, will be obvious from the description, or may be learned by practice of the invention.

BRIEF DESCRIPTION OF THE DRAWING

These and/or other aspects and advantages of the invention will become apparent and more readily appreciated from the following description of the embodiments, taken in conjunction with the accompanying drawing of which:

FIG. 1 shows the structure of a rechargeable lithium battery according to an embodiment of the present invention.

DETAILED DESCRIPTION OF CERTAIN INVENTIVE EMBODIMENTS

Reference will now be made in detail to the present embodiments of the present invention, an example of which is illustrated in the accompanying drawing, wherein like reference numerals refer to the like elements throughout. The embodiments are described below in order to explain the present invention by referring to the FIGURE.

According to an embodiment of the present invention, a negative active material for a rechargeable lithium battery includes carbon particles having interlayer spacing (d002) ranging from about 0.34 nm to about 0.5 nm at a 002 plane measured by X-ray diffraction using CuKα, and also nitrogen on the surface of the carbon particles.

The surface in this specification refers to a region ranging from the surface to about a half radius at most. The remainder of the radius is referred to as the central region. When the carbon particles have interplanar spacing at a 002 plane within the cited range, the particles may maintain appropriate amorphousness and can increase the active mass density of a negative electrode. Therefore, when the carbon particles have the interplanar spacing of a 002 plane within the cited range, the carbon particles are referred to as amorphous carbon. Examples of the amorphous carbon may include soft carbon, hard carbon, mesophase pitch carbon, fired coke, or a combination thereof.

In a negative active material for a rechargeable lithium battery, lithium ions are laminated on the edge of a carbon crystal and a void among microcrystals, pass through a solid electrolyte interface (SEI) layer of the negative active material, and are then charge-transferred on the interface among the negative active materials and diffused therein. Herein, the SEI is thin. Since the SEI has lower charge transfer resistance against ions and thus lower transmission resistances, high input and output can be accomplished.

Since soft carbon has disordered crystals compared with graphite, it has many gates helping ions to enter and exit. In addition, since the soft carbon is less disordered than hard carbon, it may more easily diffuse ions therein.

In addition, a negative active material according to an embodiment of the present invention may include nitrogen only on the surface of carbon particles, in other words, almost no nitrogen in the center region of the carbon particles. Since the negative active material includes nitrogen on the surface of carbon particles, the combination may further decrease the charge transfer resistance of lithium ions and thus can be usefully applied to a high input and output battery.

Described in more detail, when nitrogen exists only on the surface of carbon particles, many unshared electron pairs exist on the surface of the carbon particles due to the nitrogen. Accordingly, lithium positive ions may be relatively more concentrated around the interface where lithium ions enter or exit and thus may have easy input and output as well as decreased charge transfer resistances, therefore improving input/output speed. In addition, a battery may be less non-reversible when nitrogen is on the surface of carbon particles than when nitrogen is inside the carbon particles. In other words, a battery may be more possibly non-reversible when nitrogen is inside the carbon particles.

In this way, when nitrogen exists on the surface of carbon particles having the interplanar spacing at a 002 plane, a battery may have an improved high rate characteristic, that is, may have an excellent high power characteristic. When carbon particles do not have the interplanar spacing, a battery may not have an improved high rate characteristic, even if nitrogen exists on the surface thereof.

The nitrogen may be included in an amount ranging from about 0.1 to about 5 wt % based on the entire weight of a negative active material.

In addition, a negative active material according to an embodiment of the present invention includes nitrogen on the surface of carbon particles and amorphous carbon having the same crystallinity both on the surface including nitrogen and in the center region where there is little or no nitrogen. When carbon has the single amorphous structure both on the surface and in the center region, lithium may be rapidly inserted and has small resistance, and accordingly may be usefully applied to a high input and high power battery.

According to another embodiment of the present invention, a method of manufacturing the negative active material for a rechargeable lithium battery includes mixing carbon particles having interplanar spacing (d002) ranging from about 0.34 nm to about 0.50 nm at a 002 plane, measured by X-ray diffraction using CuKα, with a nitrogen-containing compound, and then heat-treating the mixture. Hereinafter, the method according to an embodiment of the present invention will be illustrated in more detail.

First of all, a mixture is prepared by mixing carbon particles having interplanar spacing (d002) ranging from about 0.34 nm to about 0.50 nm at a 002 plane, measured by X-ray diffraction using CuKα, with a nitrogen-containing compound. The carbon having interplanar spacing of a 002 plane may be amorphous carbon. Examples of the amorphous carbon may include soft carbon, hard carbon, mesophase pitch carbon, fired coke, or a combination thereof. The nitrogen-containing compound may include poly N-vinylpyrrolidone, polyacrylonitrile, melamine-formaldehyde resin, aniline, or a combination thereof.

The carbon particles and the nitrogen-containing compound may be mixed in a ratio ranging from about 99.5:0.5 wt % to about 70:30 wt %. When the nitrogen-containing compound is included within the cited range, its initial efficiency may not deteriorate but instead may bring about appropriate effects.

The carbon particles and the nitrogen-containing compound may be mixed in a solvent. Herein, the solvent may include methanol, ethanol, isopropyl alcohol, n-propanol, benzene, toluene, or a combination thereof.

In addition, the nitrogen-containing compound is added to a solvent and may then be mixed with the carbon particles as a solution. Herein, the nitrogen-containing compound may be included in a concentration ranging from about 1 wt % to about 10 wt %. In this case, the solvent for the nitrogen-containing compound may include water, methanol, ethanol, isopropyl alcohol, n-propanol, benzene, toluene, or a combination thereof.

Then, the mixture is heat-treated. The heat treatment may be performed at a temperature ranging from about 500° C. to about 1500° C. When the heat treatment is performed within the cited temperature range, nitrogen is prevented from being diffused into the center region of the carbon but may exist on the surface thereof. In addition, the carbon may maintain amorphousness. This heat treatment may be performed under an inert atmosphere such as with nitrogen or argon.

The heat treatment can be performed by gradually increasing the temperature at a predetermined rate up to a final temperature ranging from about 500° C. to about 1500° C., or just by heating the mixture at a predetermined final temperature. In the gradual increase mode, the temperature may be increased at a rate ranging from 1° C./min to 3° C./min until it reaches the range of about 500° C. to about 1500° C. Either heat treatment may be performed for 5 to 24 hours.

In addition, the heat treatment may be performed by first heating the mixture at a rate ranging from 1° C./min to 5° C./min up to a temperature ranging from about 300° C. to about 500° C. and maintaining it for 1 to 24 hours, and then subsequently heating the resulting product at a rate ranging from 1° C./min to 3° C./min up to about 700° C. to about 1500° C. and maintaining it for 1 to 24 hours. In this variation, the heat treatment may be performed under an inert atmosphere such as with nitrogen, argon, or a combination thereof.

Furthermore, the mixture may be dried before the heat treatment. The drying may be performed at a sufficient temperature and for enough time to remove the solvent, but has no particular limit. In addition, the drying may be performed by heating the mixture at a predetermined temperature or by gradually increasing the temperature at a predetermined speed.

According to another embodiment of the present invention, a rechargeable lithium battery includes a negative electrode including the negative active material, a positive electrode including a positive active material, and a non-aqueous electrolyte.

The negative electrode includes a negative active material layer including the negative active material and a binder, and a current collector supporting the negative active material layer. The negative active material layer may include about 95 to about 99 wt % of a negative active material based on the total weight of the negative active material layer.

The negative active material layer may include a binder and optionally a conductive material. The binder may be included in an amount ranging from about 1 to about 5 wt % based on the total weight of the negative active material in the binder layer. In addition, when the negative active material layer further includes a conductive material, it may include about 90 wt % to about 98 wt % of the negative active material, about 1 wt % to about 5 wt % of the binder, and about 1 wt % to about 5 wt % of the conductive material.

The binder improves binding properties of active material particles among one another and with the current collector. The binder may include a water insoluble binder, a water-soluble binder, or a combination thereof.

Examples of the water-insoluble binder include polyvinylchloride, carboxylated polyvinyl chloride, polyvinyl fluoride, an ethylene oxide-containing polymer, poly N-vinylpyrrolidone, polyurethane, polytetrafluoroethylene, polyvinylidene fluoride, polyethylene, polypropylene, polyamideimide, polyimide, or a combination thereof.

The water-soluble binder includes a styrene-butadiene rubber, an acrylated styrene-butadiene rubber, polyvinyl alcohol, sodium polyacrylate, a copolymer including propylene and C2 to C8 olefin, a copolymer of (meth)acrylic acid and (meth)acrylic acid alkyl ester, or a combination thereof.

When the water-soluble binder is used as a negative electrode binder, a cellulose-based compound may be further used to provide viscosity. The cellulose-based compound includes one or more of carboxymethyl cellulose, hydroxypropyl methyl cellulose, methyl cellulose, or alkaline metal salts thereof. The alkaline metal may be sodium (Na), potassium (K), or lithium (Li). The cellulose-based compound may be included in an amount ranging from about 0.1 to about 3 parts by weight based on 100 parts by weight of the binder.

The current collector may be selected from the group consisting of a copper foil, a nickel foil, a stainless steel foil, a titanium foil, a nickel foam, a copper foam, a polymer substrate coated with a conductive metal, and combinations thereof.

The negative active material layer may further include a conductive material. Examples of the conductive material include a carbon-based material such as natural graphite, artificial graphite, carbon black, acetylene black, ketjen black, and carbon fiber; a metal-based material such as a metal powder or a metal fiber including copper, nickel, aluminum, and silver; a conductive polymer such as a polyphenylene derivative; and a mixture thereof.

The positive electrode includes a positive active material layer and a current collector supporting the positive active material layer. The positive active material includes a lithiated intercalation compound that reversibly intercalates and deintercalates lithium ions. The positive active material may include a composite oxide including at least one selected from the group consisting of cobalt, manganese, and nickel, as well as lithium. In particular, the following lithium-containing compounds may be used.

$Li_aA_{1-b}X_bD_2$ (0.90≤a≤1.8, 0≤b≤0.5); $Li_aA_{1-b}X_bO_{2-c}D_c$ (0.90≤a≤1.8, 0≤b≤0.5, 0≤c≤0.05); $Li_aE_{1-b}X_bO_{2-c}D_c$ (0.90≤a≤1.8, 0≤b≤0.5, 0≤c≤0.05); $Li_aE_{2-b}X_bO_{4-c}D_c$ (0.90≤a≤1.8, 0≤b≤0.5, 0≤c≤0.05); $Li_aNi_{1-b-c}Co_bX_cD_\alpha$ (0.90≤a≤1.8, 0≤b≤0.5, 0≤c≤0.5, 0<α≤2); $Li_aNi_{1-b-c}Co_bX_cO_{2-\alpha}T_\alpha$ (0.90≤a≤1.8, 0≤b≤0.5, 0≤c≤0.05, 0<α<2); $Li_aNi_{1-b-c}Co_bX_cO_{2-\alpha}T_\alpha$ (0.90≤a≤1.8, 0≤b≤0.5, 0≤c≤0.05, 0<α<2); $Li_aNi_{1-b-c}Mn_bX_cD_\alpha$ (0.90≤a≤1.8, 0≤b≤0.5, 0≤c≤0.05, 0≤α≤2); $Li_aNi_{1-b-c}Mn_bX_cO_{2-\alpha}T_2$ (0.90≤a≤1.8, 0≤b≤0.5, 0≤c≤0.05, 0<α<2); $Li_aNi_{1-b-c}Mn_bX_cO_{2-\alpha}T_2$ (0.90≤a≤1.8, 0≤b≤0.5, 0≤c≤0.05, 0≤α≤2); $Li_aNi_bE_cG_dO_2$ (0.90≤a≤1.8, 0≤b≤0.9, 0≤c≤0.5, 0.001≤d≤0.1); $Li_aNi_bCo_cMn_dG_eO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1); $Li_aCoG_bO_2$ (0.90≤a≤1.8, 0.001≤b≤0.1); $Li_aMnG_bO_2$ (0.90≤a≤1.8, 0.001≤b≤0.1); $Li_aMn_2G_bO_4$ (0.90≤a≤1.8, 0.001≤b≤0.1); $Li_aMn_{1-g}G_gPO_4$ (0.90≤a≤1.8, 0≤g≤0.5); $QO_2$; $QS_2$; $LiQS_2$; $V_2O_5$; $LiV_2O_5$; $LiZO_2$; $LiNiVO_4$; $Li_{(3-f)}J_2(PO_4)_3$ (0≤f≤2); $Li_{(3-f)}Fe_2(PO_4)_3$ (0≤f≤2); and $LiFePO_4$.

In the above formulae, A is selected from the group consisting of Ni, Co, Mn, and a combination thereof; X is selected from the group consisting of Al, Ni, Co, Mn, Cr, Fe, Mg, Sr, V, a rare earth element, and a combination thereof; D is selected from the group consisting of O, F, S, P, and a combination thereof; E is selected from the group consisting of Co, Mn, and a combination thereof; T is selected from the group consisting of F, S, P, and a combination thereof; G is selected from the group consisting of Al, Cr, Mn, Fe, Mg, La, Ce, Sr, V, and a combination thereof; Q is selected from the group consisting of Ti, Mo, Mn, and a combination thereof; Z is selected from the group consisting of Cr, V, Fe, Sc, Y, and a combination thereof; and J is selected from the group consisting of V, Cr, Mn, Co, Ni, Cu, and a combination thereof.

The compound may have a coating layer on the surface, or may be mixed with another compound having a coating layer. The coating layer may include at least one coating element-included compound selected from the group consisting of an oxide of a coating element, a hydroxide of a coating element, an oxyhydroxide of a coating element, an oxycarbonate of a coating element, and a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a positive active material by using these elements in the compound. For example, the method may include any coating method such as spray coating, dipping, and the like, but is not illustrated in more detail since it is well-known to those who work in the related field. The positive active material may be included in an amount ranging from about 90 to about 98 wt % based on the total weight of the positive active material layer.

The positive active material layer also includes a binder and a conductive material. The binder and conductive material may be included in amounts of about 1 to about 5 wt % based on the total weight of the positive active material layer, respectively.

The binder improves binding properties of the positive active material particles among one another and also with a current collector. Examples of the binder include polyvinyl alcohol, carboxymethyl cellulose, hydroxypropyl cellulose, diacetyl cellulose, polyvinyl chloride, carboxylated polyvinyl chloride, polyvinyl fluoride, an ethylene oxide-containing polymer, poly N-vinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to improve electrode conductivity. It may include any electrically conductive material, unless it causes a chemical change. Examples of the conductive material include one or more of natural graphite, artificial graphite, carbon black, acetylene black, ketjen black, a carbon fiber, a metal-based material such as a metal powder, a metal fiber, or the like including copper, nickel, aluminum, silver, and the like. In addition, the conductive material may be used along with a polyphenylene derivative. The current collector may be aluminum (Al), but is not limited thereto.

The negative and positive electrodes may be fabricated in a method of mixing an active material, a conductive material, and a binder into an active material composition and coating the composition on a current collector. The solvent includes N-methylpyrrolidone and the like, but is not limited thereto. The electrode-manufacturing method is well known and thus is not described in detail in the present specification.

The non-aqueous electrolyte may include a non-aqueous organic solvent and a lithium salt. The non-aqueous organic solvent serves as a medium for transmitting ions taking part in the electrochemical reaction of a battery. The non-aqueous organic solvent may include a carbonate-based, ester-based, ether-based, ketone-based, alcohol-based, or aprotic solvent. Examples of the carbonate-based solvent may include dimethyl carbonate (DMC), diethyl carbonate (DEC), di-n-propyl carbonate (DPC), methyl-n-propyl carbonate (MPC), ethylpropyl carbonate (EPC), ethylmethyl carbonate (also known as methylethyl carbonate, EMC or MEC), ethylene carbonate (EC), propylene carbonate (PC), 1,2-butylene carbonate (BC), and the like. Examples of the ester-based solvent may include methyl acetate, ethyl acetate, n-propyl acetate, dimethylacetate(tert-butyl acetate), methyl propionate, ethyl propionate, γ-butyrolactone, 5-decanolide, γ-valerolactone, d,l-mevalonolactone, γ-caprolactone, and the like. Examples of the ether-based solvent include dibutyl ether, tetraglyme, diglyme, dimethoxyethane, 2-methyltetrahydrofuran, tetrahydrofuran, and the like, and examples of the ketone-based solvent include cyclohexanone and the like. Examples of the alcohol-based solvent include ethyl alcohol, isopropyl alcohol, and the like, and examples of the aprotic solvent include nitriles such as R-CN (where R is a C2 to C20 linear, branched, or cyclic hydrocarbon, a double bond, an aromatic ring, or an ether bond), amides such as dimethylformamide, dioxolanes such as 1,3-dioxolane, sulfolanes, and the like.

The non-aqueous organic solvent may be a single compound or used in a mixture of organic solvents. When the organic solvent is used in a mixture, the mixture ratio may be controlled in accordance with a desirable battery performance.

The carbonate-based solvent may be prepared by mixing a cyclic carbonate and a linear carbonate. The cyclic carbonate and the linear carbonate are mixed together in the volume ratio ranging from about 1:1 to about 1:9. When the mixture is used as an electrolyte, the electrolyte performance may be enhanced.

In addition, the non-aqueous organic electrolyte may be further prepared by mixing a carbonate-based solvent with an aromatic hydrocarbon-based solvent. The carbonate-based and the aromatic hydrocarbon-based solvents may be mixed together in a volume ratio ranging from about 1:1 to about 30:1.

The aromatic hydrocarbon-based organic solvent may be represented by the following Chemical Formula 1.

[Chemical Formula 1]

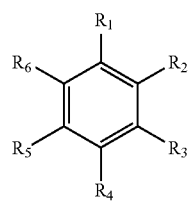

In Chemical Formula 1, $R_1$ to $R_6$ are independently selected from the group consisting of hydrogen, halogen, a C1 to C10 alkyl group, a C1 to C10 haloalkyl group, and a combination thereof.

The aromatic hydrocarbon-based organic solvent may include, but is not limited to, at least one selected from benzene, fluorobenzene, 1,2-difluorobenzene, 1,3-difluorobenzene, 4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The non-aqueous electrolyte may further include vinylene carbonate, an ethylene carbonate-based compound represented by the following Chemical Formula 2, or a combination thereof to improve cycle-life characteristics as an additive.

[Chemical Formula 2]

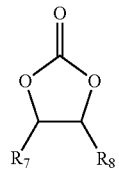

In Chemical Formula 2, $R_7$ and $R_8$ are independently selected from the group consisting of hydrogen, a halogen, a cyano group (CN), a nitro group ($NO_2$), and a C1 to C5 fluoroalkyl group, provided that at least one of $R_7$ and $R_8$ is selected from the group consisting of a halogen, a cyano group (CN), a nitro group ($NO_2$), and a C1 to C5 fluoroalkyl group.

Examples of the ethylene carbonate-based compound include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of the additive used to improve cycle life characteristics may be adjusted within an appropriate range.

The lithium salt is dissolved in an organic solvent, supplies lithium ions in a battery, provides the positive charges for basic operation of the rechargeable lithium battery, and improves lithium ion transportation between positive and negative electrodes therein. Non-limiting examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, and $LiB(C_2O_4)_2$ (lithium bis(oxalate)borate, LiBOB). The lithium salt may be used in a concentration ranging from about 0.1 M to about 2.0 M. When the lithium salt is included in the above concentration range, an electrolyte may have excellent performance and lithium ion mobility due to optimal electrolyte conductivity and viscosity.

FIG. 1 is a schematic view showing the representative structure of a rechargeable lithium battery according to one embodiment. As shown in FIG. 1, the rechargeable lithium battery 1 includes a battery case 5 including a positive electrode 3, a negative electrode 2, and a separator interposed between the positive electrode 3 and the negative electrode 2, an electrolyte solution impregnated therein, and a sealing member 6 sealing the battery case 5.

The rechargeable lithium battery may further include a separator between the negative electrode and the positive electrode, as needed. Non-limiting examples of suitable separator materials include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

The following examples illustrate this disclosure in more detail. These examples, however, should not be interpreted as limiting the scope of this disclosure.

Example 1

Soft carbon was mixed with a poly N-vinylpyrrolidone aqueous solution. Herein, the soft carbon and the poly N-vinylpyrrolidone was mixed in a ratio of 90 wt %:10 wt %. The poly N-vinylpyrrolidone aqueous solution had a concentration of 3 wt %.

The mixture was sufficiently dried in a 120° C. vacuum oven to volatilize the solvent, resulting in a powder. The powder was heat-treated at 800° C. under an argon atmosphere, preparing a negative active material in which soft carbon is coated with nitrogen on the surface. The soft carbon included nitrogen from the surface of the soft carbon particles down to a half radius from the center thereof, which could be identified through X-ray photoelectron spectroscopy (XPS) and element analysis. In addition, the nitrogen was included in an amount of 0.5 wt % based on the entire weight of the negative active material.

85 wt % of the negative active material was mixed with 5 wt % of a carbon black conductive material and 10 wt % of a polyvinylidene fluoride binder in an N-methylpyrrolidone solvent, thereby preparing a negative active material slurry. The negative active material slurry was coated on a Cu foil current collector and then dried and compressed, fabricating a negative electrode.

Example 2

1 mol of aniline and 10 g of soft carbon were added to a flask dipped in a 5° C. or lower temperature bath, n-propanol was added thereto and then they were dispersed.

The mixture was allowed to stand at room temperature to volatilize the solvent and then heated by 2° C. per minute up to 120° C. to remove all the solvent, resulting in a powder. The powder was heated by 2° C. per minute up to 300° C. under an argon atmosphere, and then maintained at this temperature for 5 hours. Then, the mixture was heated by 5° C./min up to 1000° C. under an argon atmosphere at 300° C., and maintained at 1000° C. under the argon atmosphere for 2 hours, thereby preparing a negative active material.

This soft carbon included nitrogen from the surface down to about a half radius from the center of the carbon particles, which was identified through XPS and element analysis. In addition, the nitrogen was included in an amount of 0.7 wt % based on the entire weight of a negative active material. The resulting negative active material was used according to the same method as Example 1 to fabricate a negative electrode.

Comparative Example 1

A negative electrode was fabricated according to the same method as Example 1 except for using soft carbon as a negative active material.

Comparative Example 2

A negative electrode was fabricated according to the same method as Example 1 except for using mesocarbon microbeads (MCMB 2528, Osaka Gas Co.) as a negative active material.

Comparative Example 3

A negative active material was prepared by heating 20 g of a melamine resin under an argon atmosphere by 5° C./min up to 1000° C. and maintaining it at the same temperature for 2 hours. The negative active material was used to fabricate a negative electrode according to the same method as Example 1.

Comparative Example 4

Petroleum pitch was mixed with polyacrylonitrile in a weight ratio of 1:9. This mixture was heated under an argon atmosphere by 5° C./min up to 450° C. and maintained at this temperature for 5 hours. Then, this mixture was heated from 450° C. up to 1000° C. by 5° C./min and maintained at a temperature of 1000° C. for 5 hours, thereby preparing a negative active material. The negative active material was used to fabricate a negative electrode according to the same method as Example 1.

Comparative Example 5

A negative active material was prepared according to the same method as Example 1, except for using mesocarbon microbeads (MCMB 2528, Osaka Gas Co.) instead of soft carbon. The negative active material included nitrogen only on the surface of the mesocarbon microbeads. In addition, the nitrogen was included in an amount of 0.7 wt % based on the entire weight of the negative active material. The negative active material was used to fabricate a negative electrode according to the same method as Example 1.

The negative active materials according to Examples 1 to 2 were measured by X-ray diffraction using CuKα ray. As a result, the following Table 1 shows interplanar spacing d002 of a 002 plane.

The negative electrodes according to Examples 1 to 2 and Comparative Examples 1 to 4 were used with lithium metal as a counter electrode, fabricating a coin-type half-cell (2016 cell with a diameter of 20 mm and a depth of 1.6 mm). Herein, an electrolyte solution was prepared by dissolving 1 M $LiPF_6$ in a solvent prepared by mixing ethylene carbonate, dimethyl carbonate, and diethyl carbonate in a volume ratio of 3:3:4.

The half-cell was charged and discharged once at a 0.2 C rate. Its ratio of discharge capacity against charge capacity was provided in the following Table 1 as initial charge and discharge efficiency at 0.2 C.

In addition, the cell was charged and discharged, changing its charge and discharge rate to 1 C, 5 C, 20 C, and 50 C. The following Table 1 provides charge efficiency % and discharge efficiency % calculated by respectively calculating charge and discharge capacity percentages at 5 C, 20 C, and 50 C against 1 C.

TABLE 1

| | d002 (nm) | 0.2 C initial charge and discharge Efficiency (% g) | Charge efficiency (%) | | | Discharge efficiency (%) | | |
|---|---|---|---|---|---|---|---|---|
| | | | 5 C/1 C | 20 C/1 C | 50 C/1 C | 5 C/1 C | 20 C/1 C | 50 C/1 C |
| Example 1 | 0.349 | 79.3 | 82 | 64 | 32 | 96 | 78 | 56 |
| Example 2 | 0.350 | 80.3 | 85 | 67 | 37 | 95 | 77 | 58 |
| Comparative Example 1 | 0.349 | 78.6 | 81 | 54 | 14 | 95 | 74 | 56 |
| Comparative Example 2 | 0.335 | 95.3 | 39 | 16 | — | 95 | 73 | 52 |
| Comparative Example. 3 | 0.364 | 65.4 | 76 | 52 | 16 | 93 | 68 | 48 |
| Comparative Example 4 | 0.351 | 77.1 | 77 | 48 | 25 | 92 | 70 | 51 |
| Comparative Example 5 | 0.335 | 94.2 | 36 | 15 | — | 95 | 72 | 53 |

As shown in Table 1, the cell including a graphite negative active material according to Comparative Examples 2 and 5 had similar discharge speed rates to the ones of Examples 1 and 2 but very low charge speed rates. The reason is that carbon with high crystallinity may have useful characteristics when ions are discharged out of an active material through internal diffusion but no other effect since the ions may be poorly diffused into the active material due to very small gaps among crystal layers and relatively small responsive area working as a gate when the ions are diffused from an electrolyte into the active material Comparative Example 1 included soft carbon as a negative active material and had similar characteristics to the ones of Examples 1 and 2 in terms of d002, 0.2 C initial charge and discharge efficiency, and discharge speed rate. However, Examples 1 and 2 had high lithium ion distribution concentrations due to unshared electron pairs on the surface and thus high reaction efficiency and an abundant electron environment, which decreased charge transfer resistances and thereby promoted ion diffusion inside the active material, bringing about an excellent high rate charge characteristic. As a result, lithium ions can be easily charged into an active material and into an electrolyte solution. On the other hand, Comparative Examples 1 and 2 had highly deteriorated high rate charge characteristics. In particular, Comparative Examples 2 and 5 had no value at all when the cells were charged and discharged at 50 C.

The negative active material of Comparative Example 3 was hard carbon prepared from a polymer including nitrogen, which had the largest gap between layers and thus the lowest crystallinity. In addition, since the negative active material had the lowest crystallinity, it had the lowest initial charge and discharge efficiency at 0.2 C, that is to say, the biggest initial non-reversible capacity.

The negative active material of Comparative Example 4 was a carbon negative active material prepared from a polymer prepared by mixing a polymer including nitrogen and polyacrylonitrile, and had similar charge a characteristic to the ones of Examples 1 and 2 but initial degradation of charge and discharge efficiency.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A negative active material for a rechargeable lithium battery, comprising:
   carbon particles having interlayer spacing (d002) ranging from 0.34 nm to 0.35 nm at a 002 plane measured regarding X-ray diffraction using CuK$\alpha$; and
   nitrogen on the surface of the carbon particles;
   wherein the surface includes the space from the surface of the carbon particles down to about a half radius from the center of the carbon particles;
   wherein the nitrogen concentration ranges from about 0.1 to about 5 wt % based on the weight of the negative active material;
   wherein the center of the carbon particles comprises no nitrogen; and
   wherein the carbon particles comprise amorphous carbon and the carbon particles have a single amorphous structure both on the surface and in the center region.

2. A rechargeable lithium battery comprising:
   a negative electrode comprising a negative active material having carbon particles with interlayer spacing (d002) ranging from 0.34 nm to 0.35 nm at a 002 plane, measured by X-ray diffraction using CuK$\alpha$, and nitrogen on the surface of the carbon particles;
   a positive electrode comprising a positive active material; and
   a non-aqueous electrolyte;
   wherein the surface includes the space from the surface of the carbon particles down to about a half radius from the center of the carbon particles;
   wherein the nitrogen concentration ranges from about 0.1 to about 5 wt % based on the weight of the negative active material;
   wherein the center of the carbon particles comprises no nitrogen; and
   wherein the carbon particles have amorphous carbon and the carbon particles have a single amorphous structure both on the surface and in the center region.

3. The negative active material of claim 1, wherein the surface of the negative active material extends about a half radius of the carbon particles.

4. The negative active material of claim 1, wherein the carbon particles is amorphous throughout the surface and central region of the carbon particles.

* * * * *